(12) United States Patent
Hemzal

(10) Patent No.: US 6,542,595 B1
(45) Date of Patent: Apr. 1, 2003

(54) PROCESS, GENERATING MODULE, SERVER, CONTROL MODULE AND STORAGE MEANS FOR THE CREATION OF VALIDATION RULES

(75) Inventor: Georg Hemzal, Berlin (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/477,376

(22) Filed: Jan. 4, 2000

(30) Foreign Application Priority Data

Jan. 15, 1999 (DE) .......................... 199 01 329

(51) Int. Cl.[7] .......................... H04M 3/42; G06F 9/45; G06F 17/00
(52) U.S. Cl. .......................... 379/201.03; 379/201.12; 707/102; 707/103 R; 717/136; 717/140; 717/143
(58) Field of Search ................ 379/201.01, 201.02, 379/201.03, 201.12, 221.08, 269, 284; 707/100, 101, 102, 103 R; 717/100, 136, 137, 138, 139, 140, 141, 142, 143

(56) References Cited

U.S. PATENT DOCUMENTS

| 5,323,452 A | | 6/1994 | Dickman et al. | ...... 379/201.04 |
|---|---|---|---|---|
| 5,463,682 A | * | 10/1995 | Fisher et al. | ...... 379/201.04 |
| 5,583,976 A | * | 12/1996 | Bullard, Jr. | ...... 345/440 |
| 5,694,463 A | * | 12/1997 | Christie et al. | ...... 379/221.09 |
| 5,832,070 A | * | 11/1998 | Bloom et al. | ...... 379/266.07 |
| 5,883,946 A | * | 3/1999 | Beck et al. | ...... 379/201.12 |
| 5,907,607 A | * | 5/1999 | Waters et al. | ...... 379/201.03 |
| 5,966,535 A | * | 10/1999 | Benedikt et al. | ...... 717/147 |
| 6,002,941 A | * | 12/1999 | Ablay et al. | ...... 455/518 |
| 6,038,301 A | * | 3/2000 | Nightingale | ...... 379/201.04 |
| 6,185,583 B1 | * | 2/2001 | Blando | ...... 707/507 |
| 6,225,998 B1 | * | 5/2001 | Okita et al. | ...... 345/853 |
| 6,243,092 B1 | * | 6/2001 | Okita et al. | ...... 345/866 |
| 6,243,451 B1 | * | 6/2001 | Shah et al. | ...... 379/201.03 |
| 6,363,411 B1 | * | 3/2002 | Dugan et al. | ...... 709/202 |
| 6,377,567 B1 | * | 4/2002 | Leonard | ...... 370/352 |
| 6,393,481 B1 | * | 5/2002 | Deo et al. | ...... 709/224 |
| 6,483,911 B1 | * | 11/2002 | Capriotti | ...... 379/201.03 |

\* cited by examiner

Primary Examiner—Harry S. Hong
(74) Attorney, Agent, or Firm—Sughrue Mion, PLLC

(57) ABSTRACT

The present invention relates to a process for the creation of validation rules with which a validation module can validate configuration data which can be used as operating parameters for telecommunications systems, and to a generating module, server, control module and storage means therefor. In the process, firstly a first validation rule set (BVR1, BVR2) comprising at least one validation rule written in a first, user-friendly language is acquired by a generating module (TL). Then the generating module checks whether the validation rules contained in the validation rule set comply with predefined, syntactic and semantic rules and translates the validation rules of the validation rule set from the first language into a second language, which can be evaluated by the validation module, if the validation rules in the first language have withstood the syntactic and semantic check. The validation rules of the validation rule set, translated into the second language, are then made available by the generating module in the form of a second validation rule set (VR1, VR2) for further use by the validation module.

8 Claims, 3 Drawing Sheets

PROCESS, GENERATING MODULE, SERVER, CONTROL MODULE AND STORAGE MEANS FOR THE CREATION OF VALIDATION RULES

BACKGROUND OF THE INVENTION

The present invention relates to a process for the creation of validation rules with which a validation module can validate configuration data which can be used as operating parameters for telecommunications systems, and to a generating module therefor, a server therefor, and a control module and storage means therefor.

Telecommunications systems, for example exchanges, access systems, cross-connects, network management systems, computer networks etc., are generally adapted by configuration data, selectable within specific limits, to special requirements governed by the particular area of use. In accordance with the specifications of such configuration data, control software contained in a telecommunications system can control the telecommunications system in the specified manner in the particular area of use. In a modern digital exchange it is necessary to predetermine, for example by means of appropriate configuration data, which subscriber terminals are to be controlled by the exchange, which subscriber numbers are in each case assigned to said subscribers, and which telecommunications services are in each case made available to the subscriber terminals, amongst other things. Here the configuration data of such a subscriber terminal must comply with predefined rules. Thus for example a subscriber number of a subscriber terminal must contain only numerals and no letters and must consist of a given number of numerals. Furthermore, in general it is only possible to allocate a telecommunications service to a subscriber terminal when the subscriber number of said subscriber terminal belongs to a group of subscriber numbers provided for the telecommunications service in question. For example, services defined for an ISDN telecommunications network (Integrated Services Digital Network) can be set up in full only for an ISDN-functional subscriber terminal. Thus, even for one single subscriber terminal, the conditions to be adhered to in the creation of its configuration data are very extensive and complicated. However, as inter-relationships exist between individual subscriber terminals of an exchange in respect of-configuration data, for example because a plurality of subscriber terminals are connected to a common interface module, the conditions necessitated by the inter-relationships must also be adhered to in the creation of the configuration data. As the control software of a telecommunications system can operate correctly only if the predefined configuration data, with which it is provided as operating parameters, are correct and inherently consistent, the configuration data must be checked before being input into the telecommunications system. Such a process is referred to as validation.

As configuration data for a telecommunications system are generally very extensive and must fulfil complicated conditions, such configuration data are created using a configuration system suitable for configuration data of a particular telecommunications system or a particular type of such a telecommunications system. Then configuration data are acquired by a computer using an editor and, having been input, are checked in terms of their consistency, thus validated, using a program module known as "validation module". Only then are the configuration data written into a data bank and subsequently further processed into a state in which they can be loaded into a telecommunications system known as "target system". Both the editor and the program module used to validate the configuration data, as well as the validation rules contained in the validation module, can—as is generally the case—be specially provided and appropriately programmed for the configuration data to be processed.

To enable a validation program module or a configuration system to be adapted to different types and variants of a target system, the validation rules for validating the particular configuration data can also be filed in a separate set of validation rules which is read-in and evaluated by the validation module for the particular validation. A validation rule set of this kind is in each case suitable for a specific type of target system. It is then unnecessary to create a new validation program module suitable for new configuration data or to at least partially re-program and then re-compile an existing validation program module if a change occurs in the conditions to be fulfilled by the configuration data, for example because new control software of the target system requires configuration data in a different form or of a different scope. However, the creation of a new set of validation rules for a target system, evaluatable by the validation module, on the one hand is complicated and in some cases possible only using programming tools. On the other hand, errors can easily arise, which can be detected only by extensive testing of the new or modified validation rule set. For such a test, it is then necessary to start the validation module which, using a possibly provided error routine, can detect, and optionally display, errors contained in the validation rule set to be tested. The validation module can in fact perform a correct and complete validation only in the case of a validation rule set of error-free construction. On the one hand, such an error routine renders the validation module more complex in respect of its scope and functions, and on the other hand the running of the error routines in each validation process—even in the case of an error-free validation rule set—consumes costly operating time of the computer running the validation module. Another method of testing a validation rule set, which is both complex and difficult, consists in validating configuration data by means of this validation rule set and then analyzing the result of the validation.

SUMMARY OF THE INVENTION

The object of the invention is to provide for an efficient and error-free creation of a validation rule set with which a validation module can validate configuration data which can be used as operating parameters for telecommunications systems.

This object is achieved by a process for creating validation rules with which a validation module can validate configuration data which can be used as operating parameters for telecommunications systems, a generating module according to the technical theory of claim 5, a server according to the technical theory of claim 6, a control module according to the technical theory of claim 7, and a storage means according to the technical theory of claim 8. Further advantageous developments of the invention are described in the dependent claims and the description.

The invention is based on the principle of designing a generating module, a program module which can be run on a computer, such that the generating module can acquire validation rules written in a user-friendly language. These validation rules are in each case suitable to validate configuration data of a specific telecommunications system and are contained in a validation rule set. The generating module then checks whether the validation rules contained in the validation rule set comply with predefined, syntactic and semantic rules. Only if this is the case does the generating module translate the validation rules of the validation rule set from the user-friendly language into a second language which can be evaluated by a validation module and then make the thus generated validation rules available to the validation module for later evaluation. The validation rules then no longer need be created by a user in a complicated language which can be evaluated by the validation module, but can consist of simple, user-friendly language elements. Moreover, the validation module can evaluate the validation rules without further checking, as the generating module has already checked the validation rules for errors.

In a development of the invention, the generating module reads-in a language definition data file containing instructions for the evaluation of language elements of the first user-friendly language, such that, with the aid of these instructions, the generating module can check the validation rules in the user-friendly language in terms of syntax and semantics and translate them into the second language. In this way, the user-friendly language can be extended when necessary by new language elements without the need for the generating module itself to be recreated or modified for the processing of these new language elements. In a further development of the invention, from the validation rules in the user-friendly language, the generating module generates function blocks on the basis of which the validation module can check configuration data. The function blocks can consist for example of so-called macros, which can be interpreted for example by the validation module, or also so-called functions which can be linked by the validation module. The generating module can also add text modules to the validation rules in the language which can be evaluated by the validation module. With these text modules, in the validation of configuration data the validation module can then generate messages with which the validation module can inform the user of the successful outcome of the validation, or, in qualified manner, the unsuccessful outcome thereof.

BRIEF DESCRIPTION OF THE DRAWINGS

In the following the invention and its advantages will be explained in the form of an exemplary embodiment making reference to the drawings in which.

DETAILED DESCRIPTION OF THE INVENTION

Figure 1:
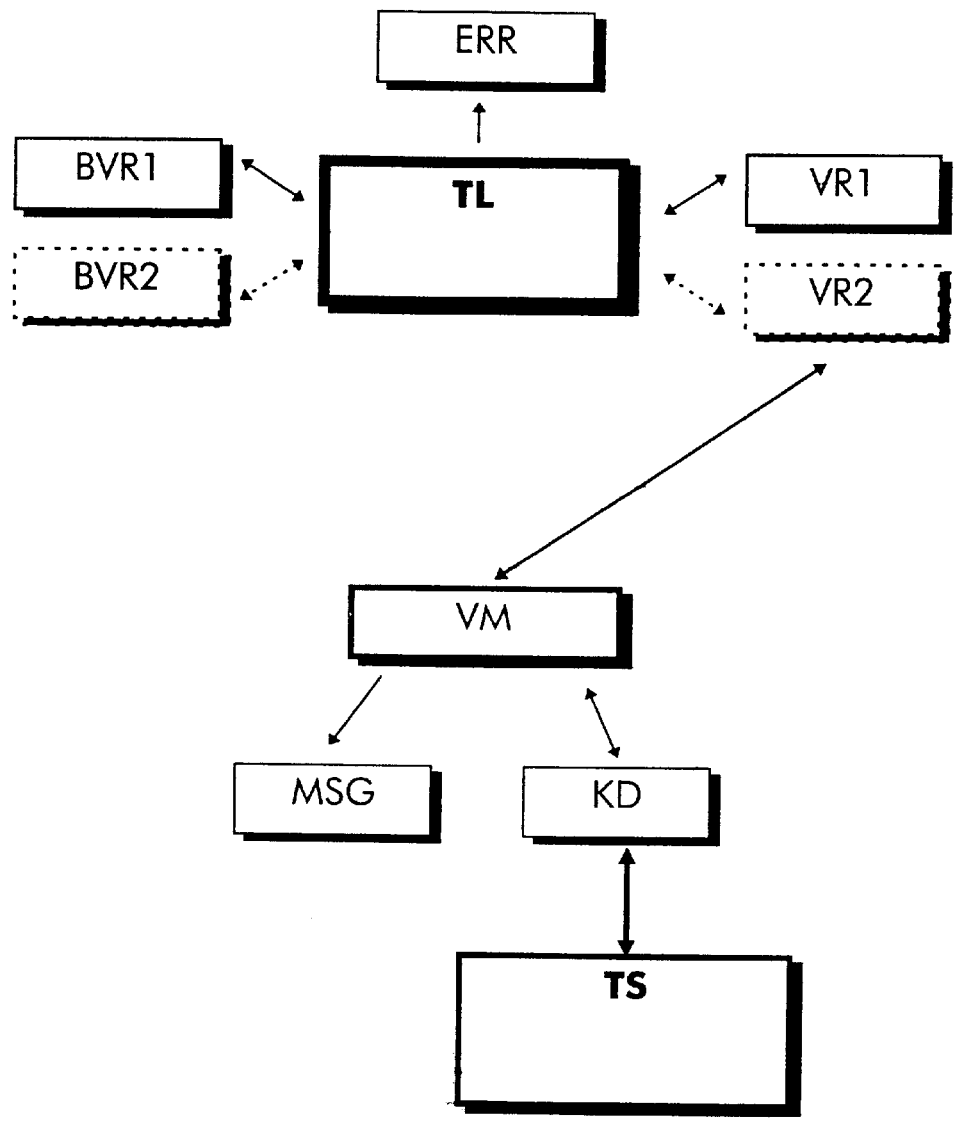
FIG. 1 illustrates a highly schematized example of an arrangement for the implementation of the process according to the invention comprising a generating module (TL) according to the invention, validation rule sets (VR1, VR2) created in accordance with the invention, and the use thereof by a validation module (VM) which validates configuration data (KD) in accordance with one of the validation rule sets.

FIG. 1 illustrates a highly schematized example of an arrangement for the implementation of the process according to the invention. Shown here is a generating module TL according to the invention which can be run as a program module on a computer, for example a PC or workstation. The generating module TL generates validation rule sets VR1 and VR2 from basic validation rule sets, represented for example by source rule sets BVR1 and BVR2 following the semantic and syntactic checking thereof. The source rules sets BVR1 and BVR2 contain one or more validation rules defined in a simple, user-friendly language referred to in the following as "basic language". If errors occur in the semantic and syntactic check, the generating module TL reports these errors with the aid of a message ERR. The validation rule sets VR1 and VR2 can be evaluated by a validation module VM for validating configuration data KD which serve as operating parameters for a telecommunications system and are arranged as normal in tabular form. An example of a telecommunications system is illustrated in FIG. 1 in the form of a target system TS. The configuration data KD can be loaded into the target system TS as operating parameters for the configuration thereof. The target system TS can consist for example of an exchange or network management system. The configuration data KD contain, for example, data relating to connections which can be switched by the target system TS, or data defining subscriber terminals controlled by the target system TS. However, the target system TS can also consist for example of a remote-control sub-station. The configuration data KD then contain, for example, data relating to measured values and commands to be acquired and output by the remote-control sub-station. In the example shown in FIG. 1 it will be assumed that the configuration data KD are to be validated in accordance with the validation rule set VR2. The validation module VM reads-in the validation rule set VR2 and validates the configuration data KD in accordance with the specifications of the rule set. The result of the check is reported by the validation module VM by means of a message MSG, for example in the form of a screen output or printer output. With the aid of the message MSG, errors which have occurred in the check can also be indicated in detail. If the configuration data KD checked by the validation module VM have withstood the check, i.e. are consistent, the configuration data KD can be loaded into the target system TS and accepted by the target system TS as operating parameters.

Figure 3:
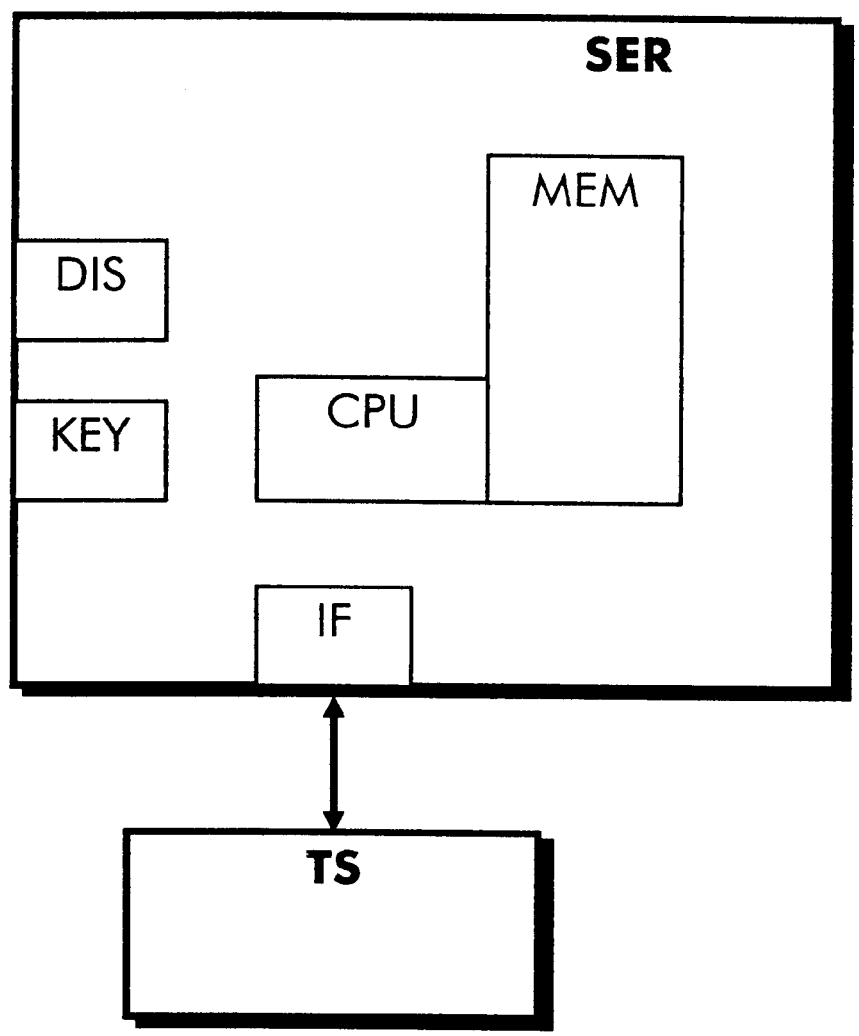

A computer for the execution of the generating module TL is illustrated in its essential components in FIG. 3 as server SER. The server SER can for example form part of a network management system. The server SER contains a control means CPU, for example a processor, for the execution of machine-readable commands, for example for the execution of the generating module TL. The server SER also comprises a memory MEM in which the generating module TL can be stored. The server SER also comprises input means and output means in the form of a keyboard KEY and a display device DIS for example for the output of data generated by the generating module TL or for the transfer of data to the generating module TL. The server SER also comprises an interface device IF via which it can exchange data with the target system TS shown in FIG. 1. The components of the server SER are interconnected by connections which have not been shown in FIG. 3. An operating system, for example UNIX or DOS (Disc Operating System), manages the operating means of the server SER and controls i.a. the execution of the generating module TL. For the further explanation of the invention, FIG. 1 will again be considered, although reference will also be made to components of the server SER illustrated in FIG. 3.

The generating module TL generates the validation rule set VR1 from a source rule set BVR1 and the validation rule set VR2 from a source rule set BVR2. The rule sets BVR1 and BVR2 represent, for example, further basic validation rule sets not shown in FIG. 1. The generating module TL reads-in the rule sets BVR1 and BVR2, for example from the memory MEM or via the interface device IF. The rule sets BVR1 and BVR2 can also be acquired by the generating module TL, for example by means of the keyboard KEY and the display device DIS. The generating module TL then presents a user with language elements of the basic language for the definition of validation rules. It is also possible for the source rule sets BVR1 and BVR2 to be acquired by a program module not shown in FIG. 1, for example an editor which sends the generating module TL listed validation rules, for example in the form of a data file which is intermediately stored in the memory MEM. The transfer and acquisition process is indicated by arrows in FIG. 1.

The source rule sets BVR1 and BVR2 can contain validation rules in the form of so-called "A-rules", "B-rules", "C-rules" or "D-rules". A-rules are suitable for validating individual data fields of a data record of the configuration data KD. Conditions between data fields of a data record are defined in B-rules. C-rules define conditions between data fields of different data records of a table, while D-rules define conditions between data fields in different tables.

The mode of functioning of the generating module TL will be described in detail in the following with reference to the processing of the source rule set BVR1. The source rule set BVR2, and the validation rule set VR2 generated therefrom, have therefore only been shown in broken lines in FIG. 1. When the generating module TL has acquired the source rule set BVR1, the generating module TL checks whether the validation rules contained in the source rule set BVR1 and written in the basic language comply with given syntactic and semantic rules. The basic language is a descriptive language for validation rules. The basic language on the one hand contains instructions known from higher programming languages, such as for example loop operators, jump conditions etc. On the other hand the basic language provides language elements specially adapted for the definition of validation rules. These language elements can serve for example to define selection commands for the formation of sub-quantities of the configuration data KD or to represent comparison operations between selected configuration data KD and data values or value ranges. The generating module TL firstly checks whether the source rule set BVR1 contains only language elements specified for the basic language. Then the generating module TL ascertains whether the language elements are correctly arranged and complete, for example whether a language construct beginning with an opening bracket is closed by a closing bracket. Further checks are possible but will not be described in detail here. If, in the forementioned checks, the generating module TL detects an error in the source rule set BVR1, the generating module TL generates an error message, for example by sending a message to the display device DIS for display thereon, or via the interface device IF to a printer, not shown in FIG. 1, for print-out. Using the display device DIS, the generating module TL can also edit the position within the source rule set BVR1 at which the error exists and present it to the user for correction. Following a correction, the generating module TL can be instructed, for example via a key depression on the keyboard KEY, to re-check the modified source rule set BVR1. Errors in the definition of validation rules in the source rule set BVR1 can easily be eliminated in this way.

If the generating module Tl has found the source rule set BVR1 to be satisfactory in terms of semantics and syntax, from the source rule set BVR1 the generating module TL can generate the validation rule set VR1 which is readable by the validation module VM. The validation rules contained in the validation rule set VR1 must for this purpose comply with semantic and syntactic rules specified by the configuration of the validation module VM. For the fulfilment of such rules, the generating module TL can define the validation rules for example in a so-called interpreter language. Validation rules in such an interpreter language can be "interpreted", i.e. evaluated, by the validation module VM and converted into machine-readable commands. The control means CPU can then execute these commands. The interpreter language can consist of a proprietary interpreter language which can be interpreted only by the validation module VM or can consist of a standard interpreter language, for example the interpreter language PERL (Practical Extraction and Report Language) commonly used in association with the UNIX operating system. The generating module TL can also insert the validation rules into the validation rule set VR1 in a form executable by a processor, as so-called functions, also referred to as library functions. The validation module VM can directly link the command sequences of such functions into its own command sequences without prior interpretation. Such a process is also referred to as "dynamic linking" of functions.

In the translation of the validation rules from the basic language into the language which can be evaluated by the validation module VM, which will be referred to in brief as "target language", the generating module TL analyzes source language constructs of the source rule set BVR1. The generating module TL now establishes which language elements are contained in a source language construct. The generating module TL also determines how these language elements are arranged in the source language construct, and the resultant semantic meaning of the language elements in question. In dependence upon the analysis results obtained in this way, the generating module TL then translates language elements of the source language construct into language elements of the target language and combines these language elements in the manner specified by the construction of the source language construct. This procedure will be explained in the following in the form of an extremely simple example. From a source language construct "AB" comprising the language elements "A" and "B", the generating module TL forms, for example, a target language construct "CD" comprising the language elements "C" and "D". However, if the source language construct is "BA", and thus consists of the language elements "A" and "B" now arranged in reverse order, instead of forming a target language construct "DC", the generating module TL forms a target language construct "DGF" which, although it contains the known language element "D" generated from the language element "B", instead of containing a language element "C" contains a combination of a language element "G"and a language element "F". The generating module TL also transfers values contained in the source language construct, which for example define value ranges to be checked in a validation rule, into the target language construct. The generating module TL can transfer such values from a source language construct into the particular target language construct either unmodified or having been modified in accordance with predefined rules. As the language elements and language constructs in the target language are of complicated construction, and possibly contain so-called macros, i.e. command sequences or even library functions, validation rules in the basic language can be defined in a substantially simpler manner and thus with fewer errors.

When the generating module TL has generated the validation rule set VR1, the generating module TL makes this available for use by the validation module VM. For this purpose the generating module TL stores the validation rule set VR1, for example in the memory MEM, from which it can be read out by the validation module VM. The validation rule set VR1 can also be evaluated by an editor which can edit the configuration data KD in accordance with the validation rules of the validation rule set VR1 and, in so doing, in the event of the input of new configuration data KD can determine whether the new input conforms with the validation rules of the validation rule set VR1.

Advantageously, the generating module TL can translate not only predefined language elements from the basic language into the target language, but also additional language elements of the basic language which are defined as required. For this purpose, the generating module TL reads-in a language definition data file (not shown in FIG. 1) in which these additional language elements are defined. The additional language elements consist of predetermined, simple basic elements, and thus are structures composed of such basic elements. The basic elements are defined both in terms of semantics and syntax and therefore can be evaluated by the generating module TL. In this way the user-friendly basic language can be extended when required by new language elements without the need for the generating module TL itself to be recreated or modified for the processing of these new language elements.

The generating module TL can insert individual predefined information items, for example text elements, for the content of the message MSG into the validation rule sets VR1 or VR2. These predefined information items can be used by the validation module VM to form the message MSG. Thus for example, for each of the validation rules contained in the validation rule sets VR1 or VR2 which are adaptable to prevailing requirements, said validation rule sets can specify which error message is to be displayed by the validation module VM when an error occurs in a check performed in accordance with the specifications of the validation rule in question. Thus for example, a text for an error message newly inserted in a validation rule set can more precisely define the origin of an error. In the insertion of the predefined information, the generating module TL in each case establishes a link between a validation rule and a predefined item of information, for example in the form of a common index, so that whenever an error occurs in the application of the particular validation rule, the validation module VM can use the relevant predefined information to generate an error message. Elements for generating the predefined information items for the validation rule sets VR1 and VR2 can be preselected by a user and already contained in the rule sets BVR1 and BVR2. The generating module TL translates these elements into a standard format which can be evaluated by the validation module VM. However, it is also possible not to provide predefined information in the rule sets BVR1 and BVR2 and for the generating module TL itself to allocate predefined information items for the message to specified validation rules in the validation rule sets VR1 and VR2. If for example a validation rule contains a frequently used, standardized element for a length check, the generating module TL can assign a predefined text "element too long" to this validation rule.

Figure 2:
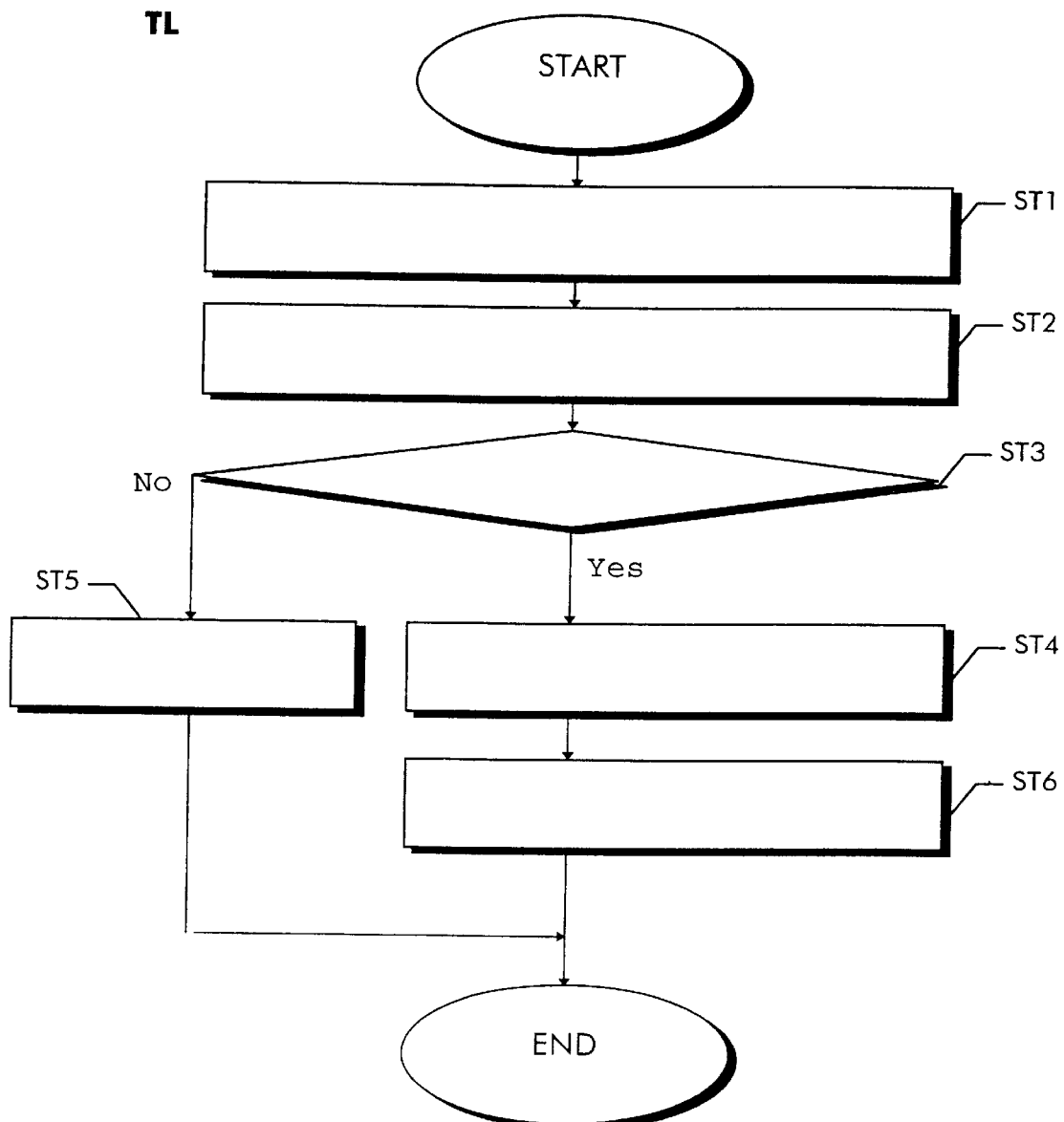
FIG. 2 is a flow diagram of a generating module (TL) according to the invention and FIG. 3 illustrates a server (SER) according to the invention for the implementation of the process according to the invention.

FIG. 2 illustrates the generating module TL in respect of its basic function steps. As already mentioned, the generating module TL consists of command sequences which are stored in a memory and can be read and directly executed by a control means, for example a processor, or can be indirectly evaluated using an interpreter program module. To clarify the drawing, the generating module TL is illustrated in FIG. 2 in the form of a flow diagram in, the course of which individual steps are executed. The individual steps each represent one single command or a sequence of commands in each case forming a functional unit, a so-called function. The number of steps in FIG. 2 can be considered as an example of a practical implementation. Commencing from a start field START, in a step ST1 the generating module TL acquires the source rule set BVR1, which is sent for example via the keyboard KEY to the generating module TL. The instructions of step ST1 are assembled in a receiving function unit, for example a sub-program. In a step ST2 the generating module TL checks whether the validation rules of the source rule set BVR1 comply with predefined syntactic and semantic rules. These rules can also be preset in the generating module TL in the form of a control data file which the generating module TL can read-in in the step ST1. In a step ST3 the generating module TL branches in dependence upon the outcome of the check performed in step ST2. If the syntactic and semantic rules have not been fulfilled by the validation rules of the source rule set BVR1, the generating module TL branches to a path "no"in a step ST5 and generates an error message. Otherwise the generating module TL branches to a path "yes" in a step ST5 in which the generating module TL translates the validation rules of the source rule set BVR1 into the target language which can be evaluated by the validation module VM and outputs the validation rules in the form of the validation rule set VR1. The generating module TL ends in a step END both after the step ST5 and after the step ST6.

What is claimed is:

1. A process for creating validation rules with which a validation module (VM) can validate configuration data (KD) which can be used as operating parameters for telecommunications systems, characterised by the steps:

acquisition by a generating module (TL) of a first validation rule set (BVR1, BVR2) comprising at least one validation rule written in a first language, checking by the generating module as to whether the validation rules contained in the first validation rule set comply with predefined, syntactic and semantic rules, translation by the generating module of the validation rules of the first validation rule set from the first language into a second language, which can be evaluated by the validation module, if the validation rules in the first language have withstood the syntactic and semantic check, output of an error message by the generating module if the validation rules in the first language have not withstood the syntactic and semantic check and provision by the generating module of the validation rules, translated into the second language, in the form of a second validation rule set (VR1, VR2).

2. A process according to claim 1, characterised in that the generating module (TL) can read-in predefined language definitions containing instructions for the evaluation of language elements of the first language, and that with the aid of these instructions the generating module can perform a syntactic and semantic check on the validation rules contained in the first validation rule set (BVR1, BVR2) and translate them into the second language.

3. A process according to claim 1, characterised in that in the translation of the validation rules of the first validation rule set (BVR1, BVR2) into the second language, function blocks are generated with which the validation module (VM) can check the configuration data (KD).

4. A process according to claim 1, characterised in that in the translation, the generating module (TL) can insert predefined information items into the second validation rule set (VR1, VR2), with the aid of which predefined information items the validation module (VM) can generate a message (MSG) containing an item of information relating to the outcome of the check.

5. A generating module (TL) for creating validation rules with which a validation module (VM) can validate configuration data (KD) which can be used as operating parameters for telecommunications systems, characterised in that the generating module comprises a receiving function unit (ST1) which is designed such that the generating module can acquire a first validation rule set (BVR1, BVR2) comprising at least one validation rule written in a first language, that the generating module comprises a checking function unit (ST2) which is designed such that the generating module can check whether the validation rules contained in the first validation rule set comply with predefined syntactic and semantic rules, that the generating module comprises a translation function unit (ST4) which is designed such that the generating module can translate the validation rules of the first validation rule set from the first language into a second language, which can be evaluated by the validation module, if the validation rules in the first language have withstood the syntactic and semantic check, that the generating module comprises a reporting function unit (ST5) which is designed such that the generating module can output an error message if the validation rules in the first language have not withstood the syntactic and semantic check, and that the generating module comprises a retrieval function unit (ST6) which is designed such that the generating module can make available the validation rules, translated into the second language, in the form of a second validation rule set (VR1, VR2).

6. A server (SER) for creating validation rules with which a validation module can validate configuration data which can be used as operating parameters for telecommunications systems, characterised in that the server comprises receiving means (KEY, IF) which are designed such that the server can acquire a first validation rule set (BVR1, BVR2) comprising at least one validation rule written in a first language, that the server comprises checking means which are designed such that the server can check whether the validation rules contained in the first validation rule set comply with predefined syntactic and semantic rules, that the server comprises translation means which are designed such that the server can translate the validation rules of the first validation rule set from the first language into a second language, which can be evaluated by the validation module, if the validation rules in the first language have withstood the syntactic and semantic check, that the server comprises reporting means (DIS) which are designed such that the server can output an error message if the validation rules in the first language have not withstood the syntactic and semantic check, and that the server comprises retrieval means (MEM, IF) which are designed such that the server can make available the validation rules, translated into the second language, in the form of a second validation rule set (VR1, VR2).

7. A control module, in particular a compact disc (CD), floppy disc or the like, on which a generating module (TL) is stored and which serves to execute the process according to claim 1 in association with a processor.

8. A storage means, characterised in that a generating module (TL) according to claim 4 is stored thereon.

* * * * *